United States Patent [19]

D'Agostino et al.

[11] E Patent Number: Re. 31,824

[45] Reissued Date of Patent: Feb. 5, 1985

[54] SEPARATOR MEMBRANES FOR ELECTROCHEMICAL CELLS

[75] Inventors: Vincent F. D'Agostino, Huntington Station; Joseph Y. Lee, Lake Grove; Joseph C. Sentisi, Ozone Park, all of N.Y.

[73] Assignee: RAI Research Corporation, Hauppauge, N.Y.

[21] Appl. No.: 431,172

[22] Filed: Sep. 30, 1982

Related U.S. Patent Documents

Reissue of:

[64] Patent No.: 4,230,549
Issued: Oct. 28, 1980
Appl. No.: 802,035
Filed: May 31, 1977

[51] Int. Cl.[3] ..... C08F 259/08; C08F 255/02; C08F 2/46

[52] U.S. Cl. ..... 204/159.17; 429/192; 429/250; 204/159.15; 428/421; 428/507; 525/244

[58] Field of Search ..... 204/159.15, 159.17; 429/192, 250; 428/421, 507; 525/244

[56] References Cited

U.S. PATENT DOCUMENTS

| | | | |
|---|---|---|---|
| 3,472,700 | 10/1969 | Kollman et al. | 429/250 |
| 4,012,305 | 3/1977 | D'Agostino et al. | 204/159.17 |
| 4,110,143 | 8/1978 | Cogliano et al. | 429/250 |
| 4,196,065 | 4/1980 | Gaussens et al. | 204/159.17 |

FOREIGN PATENT DOCUMENTS

| | | | |
|---|---|---|---|
| 853971 | 11/1960 | United Kingdom | 204/159.17 |

OTHER PUBLICATIONS

"Irradiation-Grafted Polymeric Films", Hamil, H. F. et al., *Journal of Polymer Science*: Part A-1, vol. 9, (1971), No. 2, pp. 363-376.

*Primary Examiner*—Wilbert J. Briggs, Sr.

[57] ABSTRACT

This disclosure is directed to polymer membranes to be used in electrochemical cells and improved processes for producing the same. The membranes are produced by radiation grafting techniques. The improved process includes the grafting of a hydrophilic monomer, such as methacrylic acid in a chlorinated organic solvent onto an inert base film such as polyethylene. The process also includes but is not limited to the use of inhibitors to limit homopolymerization of a grafting material, as well as emulsifying agents to lower the electrolytic resistance of the finished membrane.

30 Claims, 11 Drawing Figures

SEPARATOR MEMBRANES FOR ELECTROCHEMICAL CELLS

Matter enclosed in heavy brackets [ ] appears in the original patent but forms no part of this reissue specification; matter printed in italics indicates the additions made by reissue.

BACKGROUND OF THE INVENTION

Electrochemical cells may be classified as primary or secondary. Primary cells are those that derive electrical energy from a chemical state and are generally not rechargeable. Secondary cells are rechargeable electrically by passing a current through the cell in a direction reversed from that of discharge.

Basically an electrochemical cell is made up of two half-cells, each comprising an electronic conducting phase or electrode in contact with a second phase called an electrolyte in which ionic conduction takes place. During discharge the electrolyte loses electrons to one of the electroes thereby oxidizing that electrode. At the other electrode the electrolyte gains electrons and is thereby reduced. The electrolyte associated with the cathode is referred to as the catholyte and that with the anode as the anolyte. In some cells the catholyte and anolyte are different solutions and therefore require a separator membrane to prevent the two solutions from physically mixing. In other types of cells the catholyte and anolyte are the same in which case the separator functions to physically separate the electrodes. These membranes should not, however, prevent ionic conductance between the catholyte and anolyte.

Examples of primary battery systems are those having as electrodes: mercury zinc; silver-zinc; lead-zinc; copper-zinc; copper-magnesium; and silver-magnesium.

Examples of the most common secondary battery systems are: nickel-cadium; silver-zinc and silver-cadium. A common electrolyte used in both the primary and secondary cells is a 30 to 45% solution of KOH. Other types of electrochemical cells in which the membranes of the present invention may be used are those used for electrolysis and dialysis.

The separator membranes used in the above system must possess certain physical and chemical properties, such as low electrolytic resistance, and high resistance to oxidation particularly in alkaline solutions at high temperatures. Furthermore, the membrane must have sufficient mechanical strength to withstand the rigors of battery assembly and also prevent dendrite growth or treeing between the two electrodes. These dendrites, if not stopped by a separator, bridge the gap between the electrodes thereby short circuiting the cell.

In the past a variety of separators have been used to prolong the life of cells. For example micro-porous materials have been tried, however, it was found that these did not prolong cell life due to the fact that they had too open a structure. Separator membranes composed of cellulosics such as cellophane have also been tried. Although these membranes have low [elecolytic] *electrolytic* resistance and the capability of slowing the migration of silver oxides toward the cathode they undergo severe oxidative degradation and hydrolytic attack both of which limit the life of the cell. More recently membranes with improved characteristics have been developed using irradiation grafting techniques. Membranes of this type are disclosed in U.S. Pat. Nos. 3,427,206 and 4,012,303.

It is an object of this invention to provide improved permselective membranes for use in electrochemical cells, which have low electrolytic resistance.

It is a further object to provide a membrane which is resistant to oxidative degration in electrolytic solutions, particularly at high temperatures.

It is a still further object of this invention to provide a novel method for the preparation of membranes and the use of such membranes in electrochemical cells.

Still other objects and advantages of the present invention will be obvious and be apparent to those skilled in the art from the specification and the appended claims.

THE INVENTION

Figure 1:
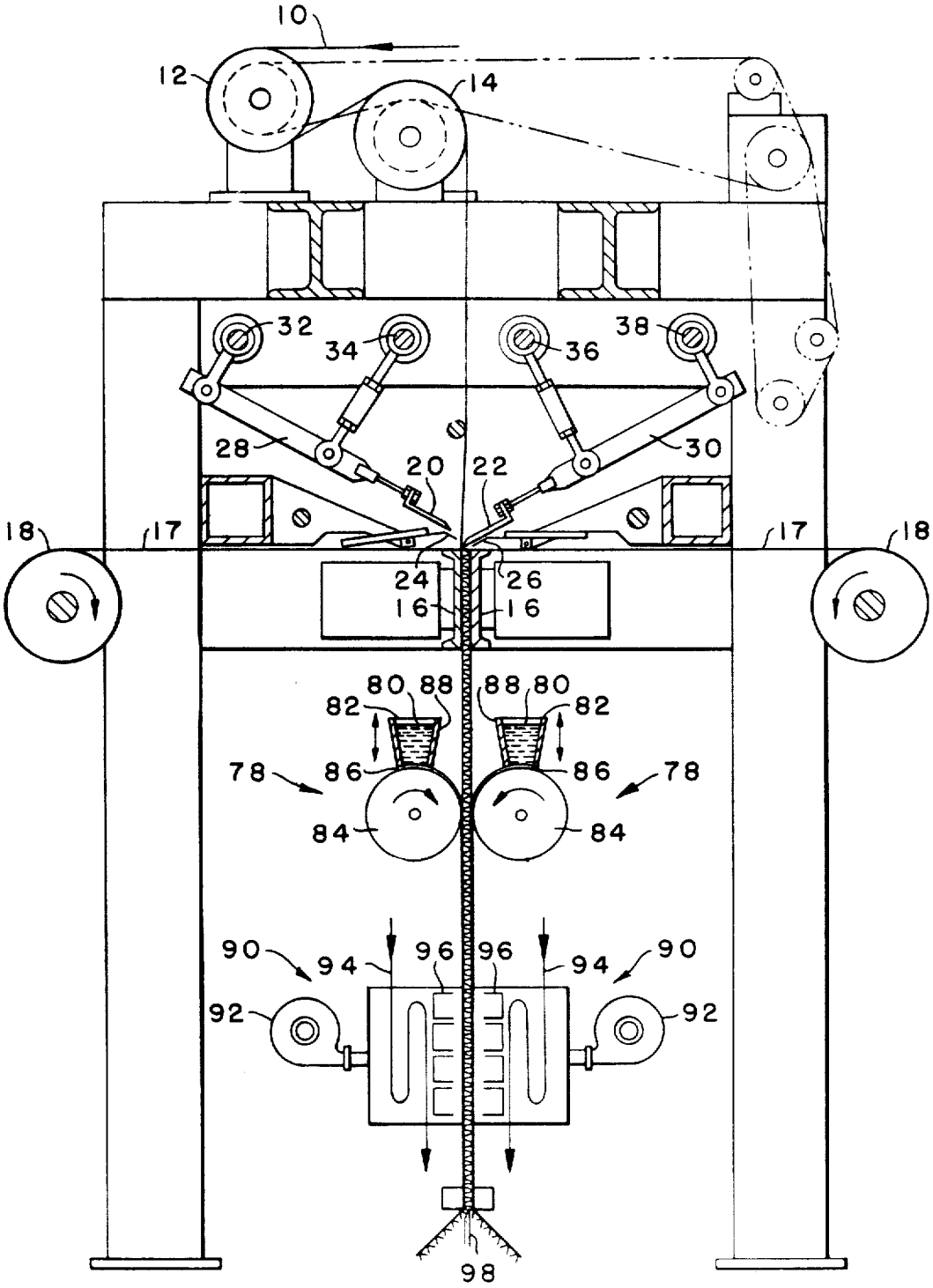
FIG. 1 is a sectional view of a reaction for conducting the process of this invention.

This invention relates to novel permselective membranes, the method of making these membranes and their application to electrochemical cells, specifically primary and secondary type cells.

In preparing the membranes of the present invention, cross-linked and non-cross-linked inert polymeric films, such as polyethylene or polypropylene are contacted with a hydrophilic monomeric material which is grafted on the film using radiation grafting. These monomeric material are contained in solutions of either an organic solvent and a transfer agent or in the case of non-cross-linked films a chlorinated hydrocarbon. During the grafting process air is introduced into the grafting solution, i.e., by means of a gas-permeable membrane, for the purpose of inhibiting homopolymerization of the monomer. In addition, small amounts of a chemical inhibitor, such as hydroquinone are added to the grafting solution to aid in inhibiting homopolymerization of the monomer. After grafting the membrane the film is passed through a number of wash baths and finally is introduced into an emulsifier bath which has the effect of lowering the electrolytic resistance of the membrane. The present invention also includes the use of a novel canister and tube arrangement for accomplishing the above grafting and inhibiting process.

The novel separator membranes of the present invention may be prepared by radiation grafting a hydrophilic monomeric material onto an inert polymeric film in a solvent for the monomer. The term hydrophilic monomers as used in this disclosure refers to any monomer which is hydrophilic or may be made hydrophilic by subsequent treatment, as for example sulfonation. Furthermore, any reference to percentages are to be construed as being based upon weight unless otherwise stated. The monomers which may be utilized in the present invention are any monomers terminally unsaturated, such as styrene, vinyl pyridine, vinyl acetate, acrylonitrile and acrylic and methacrylic acids; the acrylic and methacrylic acids being the preferred monomers.

The base film which may be used is selected from the group of hydrocarbon films and halogenated analogs, such as polypropylene film, polyethylene film, polytetrafluoroethyleneethylene copolymer film. The preferred base film is polyethylene. These base films may be crosslinked or non-crosslinked depending on the application and type of grafting solution to be used. Generally, it has been found that the cross-linked membranes are subject to less swelling in electrolytes, this is because coiled linear chains in polyethylene may be "tied together" by cross-linking them into a single three dimensional structure thereby making the film less likely to absorb the electrolyte as well as insoluble in most solvents.

The solvents for the monomers are *toluene and* the chlorinated hydrocarbons such as chloroform, dichloroethylene, 1,1,1 or 1,1,2 trichloroethane, [toluene] and methylene chloride; toluene and methylene chloride being preferred. Although the present disclosure [uses] *includes* the chlorinated hydrocarbons as solvents, it is noted that any halogenated hydrocarbon which is a solvent for the monomer and a non-solvent of the base material may be used. Furthermore, although a number of specific base films and monomers are disclosed it is understood that any conventionally substituted materials may be used.

In preparing one embodiment of the present invention, commercially available rolls of polyethylene are cross-linked by exposure to beta radiation at a preferred dose of approximately 85 Mrad. ±5. These films are double layered such that twice the amount of film may be processed simultaneously. Subsequent to cross-linking the film may be cut to the desired width for processing and rerolled. During the rerolling operation the individual layers of the double layered film are momentarily separated by passing a roller bar between them. It has been found that this eliminates the "tackiness" between the two sheets which is probably a result of the heat generated during the radiation cross-linking step as well as a small amount of surface deterioration of the polyethylene film. It has been found that if this tackiness is not eliminated prior to grafting the monomer onto the film it becomes extremely difficult to separate the individual sheets from each other without the additional steps of passing the grafted film through a water bath.

Subsequent to the above separation step the double layered film is rolled together with an absorbant paper, such that the paper separates one double layer from other double layers. It has been found that bleached Kraft paper is quite suitable for this purpose. However, any absorbant paper having a thickness of between 7 and 9 mils will suffice. In any event the paper used should have an absorbing capacity sufficient to hold enough grafting material to penetrate a double layer of the base film.

The bulk roll of film which includes the absorbant paper is now ready to be submerged into the grafting material.

The particular grafting monomer is then chosen depending upon the application or type cell in which the membrane is going to be used. A grafting solution to be used with the previous cross-linked polyethylene comprises a monomer to be grafted, a chain transfer agent and a solvent. The amount of monomer is in the range of from about 10 to 50%, the transfer agent is from about 3 to 6% and the solvent is from about 44 to 87%, each by weight based on the total grafting solution. The preferred grafting solution for a polyethylene cross-linked base film is 32% methacrylic acid, 3.6% carbon tetrachloride and 64.4% toluene.

It is also possible to produce a satisfactory membrane utilizing a polyethylene base sheet which has not been cross-linked by radiation. In this case, it has been found that a grafting solution comprising from 1 to 50% by weight of a hydrophilic monomer and from about 50% to 99% of a chlorinated hydrocarbon gives good results. It has been found that this grafting solution gives particularly good results when using non-cross-linked materials, in that it results in maximum chain transfer of the graft material. The preferred monomer is acrylic or methacrylic acid and the preferred solvent is methylene chloride. A preferred grafting solution for a non-cross-linked film is 20% acrylic or methacrylic acid and 80% methylene chloride.

When using a toluene base solvent a canister or container large enough to accept the bulk roll is partially filled with the grafting solution. The bulk roll is dropped into the canister and allowed to slowly sink as the paper layers within the roll absorb the solvent. The remainder of the canister is then filled to the desired height. When using the methylene chloride base solution it is necessary to force soak the absorbant paper with the grafting solution since the roll will not sink when simply placed in the solution. This presoaking is accomplished in a separate apparatus which applies a vacuum to one end of the roll while introducing the grafting solution to the other end. The solution is drawn through the roll thereby saturating the absorbant paper. The soaked roll is then placed in a canister and the remainder of the canister filled with additional grafting solution. The roll is now ready to be exposed to the radioactive source.

During the grafting process homopolymerization of the monomeric material takes place in the areas surrounding the roll. This homopolymerization if not inhibited results in the formation of a solid mass of polymer around the roll which makes it difficult and in many cases impossible to remove the roll from the canister. The process of the present invention has overcome the above disadvantage in two ways. In the case of a cross-linked base film using a toluene solvent system for the monomeric grafting material, air is introduced into the grafting solution to tie up the free radical formed during irradiation, thereby inhibiting the homopolymerization process. In the case of a non-cross-linked base film using a methylene chloride solvent system for the monomeric grafting material a chemical inhibitor, in addition to air, is introduced into the grafting solution.

As can be seen in the attached FIG. 1 air is introduced to the bottom and sides of the bulk roll 2 by means of a large tube 3 which is fitted through the center of the roll. This tube extends out of canister 1 through cover 4 and is adapted at its lower end with a gas-permeable membrane 5 such as tetrafluoroethylenehexafluoropropylene which allows the air to pass into the solvent but prevents the solvent from entering the tube. Tube 3 is further provided with extensions 8 which are adapted to raise the roll off the bottom of the canister. It has been found that a tube having a diameter of above two to three inches is large enough to introduce sufficient air into approximately 7 gallons of grafting solution to inhibit homopolymerization at the bottom and the sides of the roll. Furthermore, cover 4 is adapted with a plurality of openings 7 which allow air to enter the upper part of the canister. Although the above canister may be made of a variety of materials the material selected should be non-reactive with the grafting solution. In reference to the gas-permeable membrane it has been found that a membrane having a thickness of from about ½ mil to 1 mil gives maximum gas diffusion.

Homopolymerization inhibition is accomplished at the top of the roll by simply adjusting the level of the grafting solution such that it is approximately 2 to 3 inches above the top of the roll. Although this height is not critical it is important since if it is too small the air above the surface will inhibit not only polymerization in the solvent but also the grafting of the monomer onto the film. On the other hand, if the amount of monomer solution is too great, homopolymerization and solidification will take place close to the top and sides of the roll. In practice a small amount of inhibition, on both edges of the roll is preferred since the ungrafted film has been found to be stronger than the grafted film thereby facilitating the handling of the film during processing.

In addition to the above method of inhibition chemical inhibitors such as hydroquinone methyl ether, or any other conventional inhibitor contained in microporous polypropylene sacks 6, may be placed in the bottom or affixed to the sides of the canister to further inhibit homopolymerization. If has been found that approximately four sacks each containing from 2 to 3 grams of inhibitor gives good results for about every 7 gallons of grafting solution.

After the rolls are fitted into the canister they are ready for exposure to the radioactive source. It has been found that an exposure to cobalt 60, which emits gamma radiation, for an exposure of from 0.1 to 5 Mrad preferably 1.1 Mrad is sufficient to graft the monomer to the film base. In practice the canisters are stacked two high on carts which are provided with means to hydraulically rotate the canisters during exposure in order to ensure even grafting. Additionally, the upper and lower canister are switched halfway through the exposure period to ensure even grafting of the rolls from top to bottom.

After exposure the roll is unwound and the membrane run through a methylene chloride bath to leach out the toluene or any other flammable material. The spacing paper is run through a water bath, rolled and discarded.

The membrane is then run through a number of wash tanks, the first containing boiling water, the second a boiling solution of 4% KOH and the third rinse water. These baths remove any homopolymer which may have formed during irradiation and any residual monomer. The residence time of the film in each bath may vary from 30 seconds to 10 minutes, however the preferred time is 3 minutes. The 4% solution of KOH has the effect of converting the methacrylic acid to a potassium salt which aids in lowering the resistance of the separator and this has been found to be the optimum KOH concentration.

After or during the last bath the film is passed through an emulsifying solution which has the effect of lowering the electrolytic resistance of the membrane as well as imparting better wetting characteristics to the membrane without adversely affecting its chemical stability. The beneficial effect of the emulsifiers on the electrolytic resistance of the separator is particularly obvious when the temperature of the complete battery falls below 0° C.

Emulsifiers fall into the class of surface-active agents. Surface-active agents are grouped into three classes according to their physiochemical properties, these classes are anionic, cationic, and non-ionic. In the anionic class, there are the carboxylic acid salts, the sulfuric acid esters, the alkanesulfonates, the alkylarylsulfonates and others. Under the cationic category, there are the quaternary nitrogen salts, the nonquaternary nitrogen bases and others. Finally in the non-ionic category, there are the ethylene oxide derivatives having long chain alkyl groups, (polyethoxy surfactants), the polyhydroxy esters of sugar alcohols, and the amphoteric surfactants. Specific examples of the non-ionic emulsifiers are Triton X 100, sold by Rohm and Haas Co., which is an isooctyl phenoxyl polyethoxy ethanol and Emulphogene BC240 sold by General Aniline and Film Corp. which is an alkoxypolyethylene oxyethanol.

Examples of anionic emulsifiers are Ultrawet KX, sold by Arco Chemical Co. which is sodium linear alkyl sulfonate; Triton X 200 sold by Rohm and Haas which is a sodium salt of alkyl aryl polyether sulfonate and Sipex E.S. sold by Alcolac Chemical Corp which is lauryl ethoxylate sulfate.

An example of a cationic emulsifier is Triton X 400 sold by Rohm & Haas which is a stearyldimethylbenzylammoniumchloride.

Solutions of these emulsifiers in water have the effect of lowering the electrolytic resistance of the separators even at very low concentrations. The residence time of the separator in the emulsifier solution is not critical and may vary from a few seconds to five minutes but is preferably from one to three minutes. The temperature can be at room temperature but preferably at elevated temperatures from 80° C. to 90° C. The beneficial effects on the radiation grafted separator by the three classes of emulsifiers can best be seen in Table I.

TABLE I

EFFECT OF EMULSIFIER TYPE ON THE ELECTROLYTIC RESISTANCES OF RADIATION GRAFTED SEPARATORS IN 40% KOH AT ROOM TEMPERATURE

| Separator | Control (No Emulsifier) | Cationic 2% Triton X400 in $H_2O$ | Anionic 2% Ultra-wet KX in $H_2O$ | Non-ionic 2% Triton X100 in $H_2O$ |
|---|---|---|---|---|
| 1. 65% grafted | 18 mΩ-in$^2$ | 17 mΩ-in$^2$ | 11 mΩ-in$^2$ | 5 mΩ-in$^2$ |
| 2. 65% grafted | 16 | 16 | 11 | 6 |
| 3. 45% grafted | 34 | 18 | 23 | 14 |
| 4. 22% grafted | 48 | 19 | 25 | 15 |
| 5. 19% grafted | 68 | 20 | 33 | 19 |

As can be seen from Table I all of the emulsifier types have the effect of lowering the separator's electrolytic resistance, particularly the non-ionics. Separators 2–5 listed in Table I all have cross-linked low density polyethylene base films with varying percentages of methacrylic acid grafted thereon as listed in Column 1. Separator 1 has a polypropylene base film.

Furthermore, within each emulsifier category, the hydrophilic-lipophilic balance (HLB) of the emulsifier as defined by W. C. Griffin in J. Soc. Cosmetic Chemist, 1,311, 1949 is also important. According to the HLB theory, there is an optimum emulsifier which possesses the same hydrophilic-lipophilic balance as the material to be emulsified. The effect of HLB values of the emulsifier on the separator's electrolytic resistance is given in Table II.

TABLE II

EFFECT OF HYDROPHILIC-LIPOPHILIC BALANCE OF AN EMULSIFIER ON THE ELECTROLYTIC RESISTANCE OF A SEPARATOR IN 40% KOH AT ROOM TEMPERATURE

| HLB NUMBER | ELECTROLYTIC RESISTANCE |
|---|---|
| Control | 58 mΩ-in$^2$ |
| 4.5 | 33 |
| 7.0 | 24 |
| 9.5 | 23 |
| 12 | 24 |
| 15 | 20 |

It has been found that when using the inert polymeric base films of the present invention best results are achieved when using emulsifiers having an HLB value of 10 or higher, preferably 15.

When referring to the following tables the individual separators are listed by their commercially available trade number. Listed below is a brief description of these separators:

Pudo 193—is commercially available cellophane from DuPont.

P2291 40/20—is a separator having a cross-linked low density polyethylene base film with approximately a 65% graft of methacrylic-acid thereon made by RAI Research Corporation of Hauppauge, New York as are the following P and E designated numbers.

P2291 40/30—is a separator having a cross-linked low density polyethylene base film with a 44.5±8.5% graft of methacrylic acid thereon.

P2291 40/60—is a separator having a cross-linked low density polyethylene base film with a 25.5±6.5% graft of methacrylic-acid thereon.

P2190 40/20—is a separator having a laminate of one layer of 2291 40/20 and one layer of Pudo 193.

P6001—is a separator having a non-cross-linked polypropylene base film with approximately a 65% graft of methacrylic acid thereon.

P3190 40/20—is a separator having a laminate of a graft copolymer of acrylic acid on a low density polyethylene film base and one layer of Pudo 193.

Also note that an E in place of a P designates that the separator has been treated with a 2% solution of TRITON X100 for three minutes.

Where batteries have to perform at low temperatures, the electrolytic resistance of the separator is a significant factor in the total resistance of the battery. The total resistance of a cell is composed of the resistances of the electrolyte, the separator, the plates, etc., among which the electrolyte is usually the major contributor at room temperature. However, at low temperatures, the resistance of the separator may become equal to or greater than the resistance of the electrolyte, as shown in TABLE III.

For instance, 40% KOH has a resistance of 265 mΩ-in$^2$ at 20° C. while at P2291 40/20 membrane has a resistance of 16 mΩ-in$^2$ at the same temperature. At −30° C, the resistance of 40% KOH increases to 610 mΩ-in$^2$ while the resistance of the separator increases to only 240 mΩ-in$^2$. On the other hand the resistance of P2291 40/60 at −30° C. is 962 mΩ-in$^2$ which is larger than the resistance of the electrolyte at the same temperature thereby indicating that this separator behaves poorly at low temperatures. As stated above the effect of emulsifiers on separator resistance at low temperatures become extremely significant. As shown in TABLE III, the P2291 40/20 at −30° C. has a resistance of 240 mΩ-in$^2$ while that of the emulsified E2291 40/20 is only 111 mΩ-in$^2$ which is less than half of the nonemulsified separator.

To be effective, the concentration of the emulsifier in the emulsifing solution must be over the critical miscelle

TABLE III

EFFECT OF EMULSIFIER ON LOW TEMPERATURE ELECTRICAL RESISTANCE OF BATTERY SEPARATORS

Figure 2:
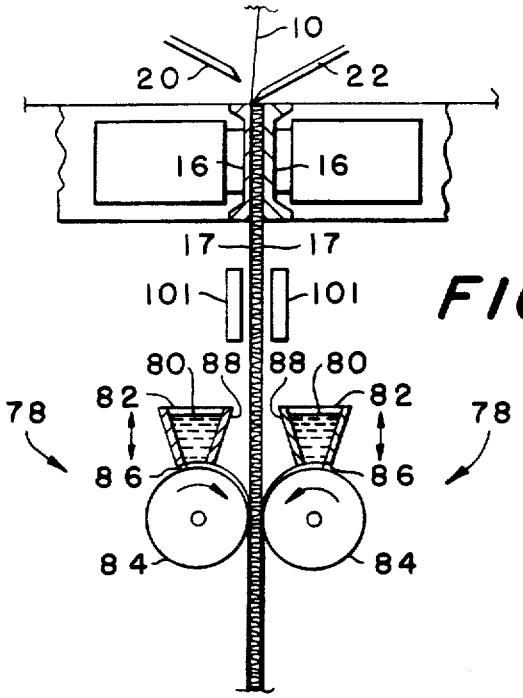
FIG. 2 is a graph of the resistance versus emulsifier on a membrane of this invention.
Figure 3:
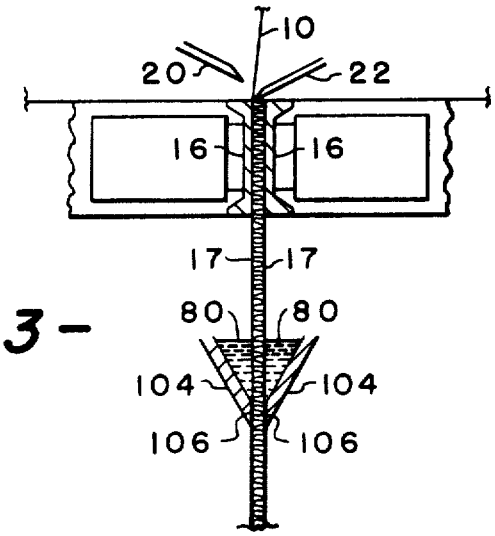
Figure 4:
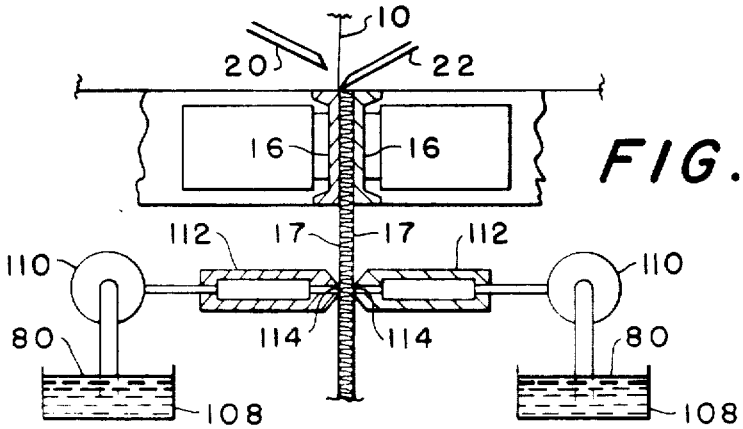
Figure 5:
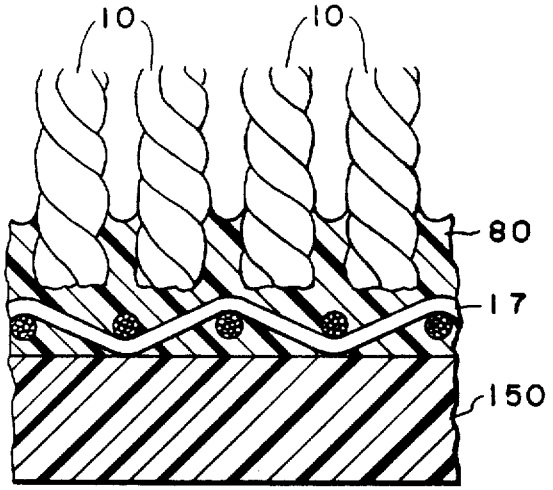
Figure 6:
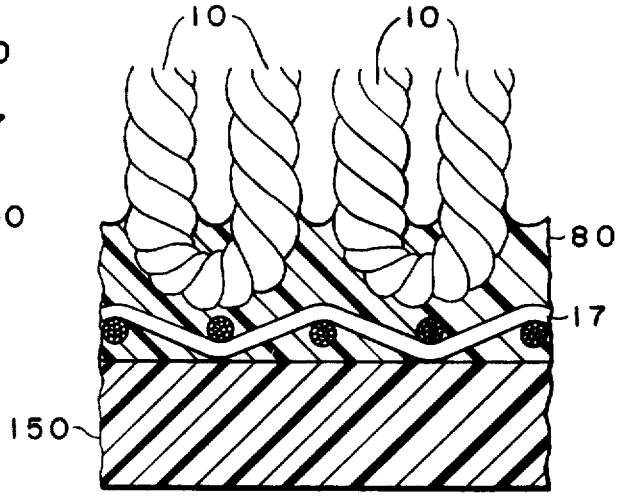
Figure 7:
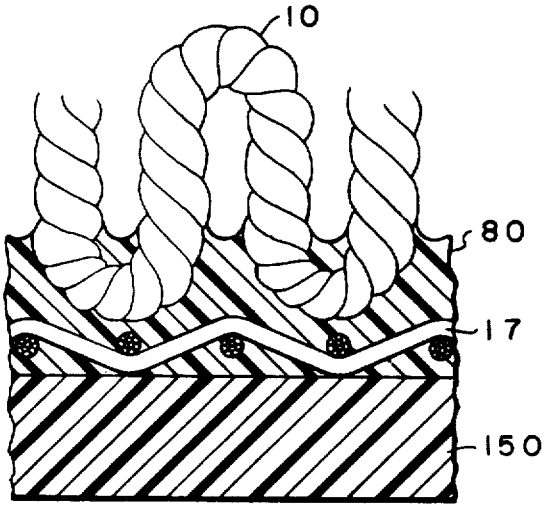
Figure 8:
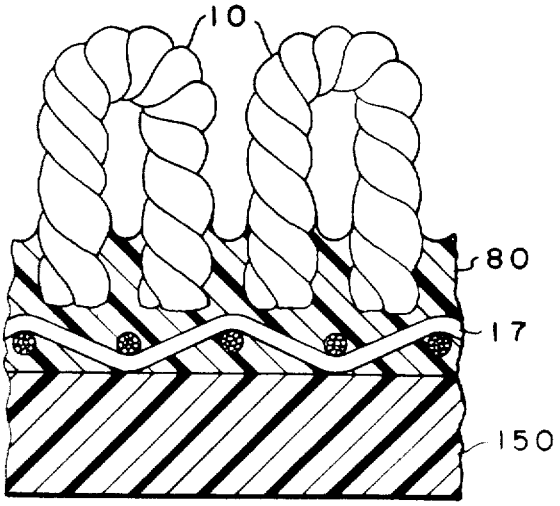
Figure 9:
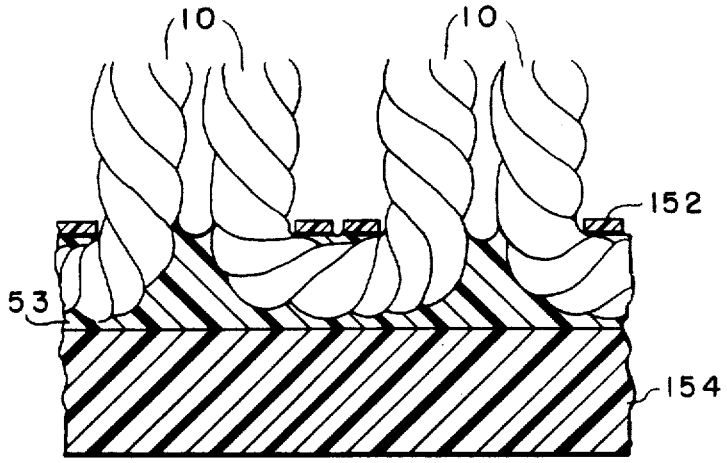
Figure 10:
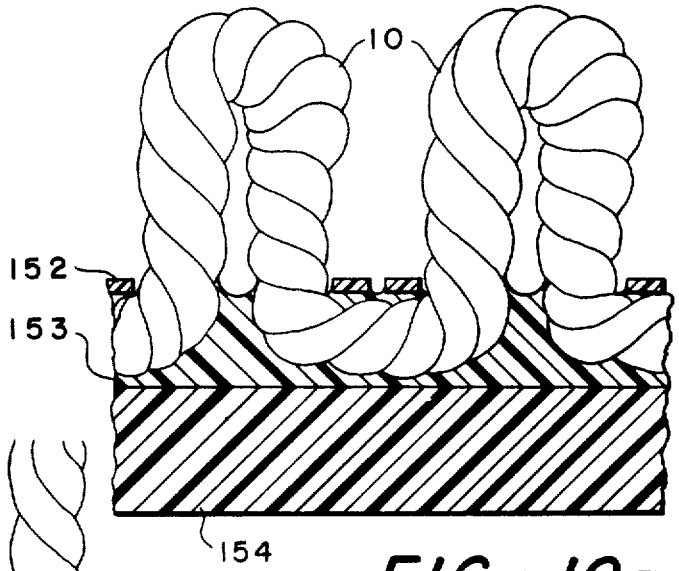
Figure 11:
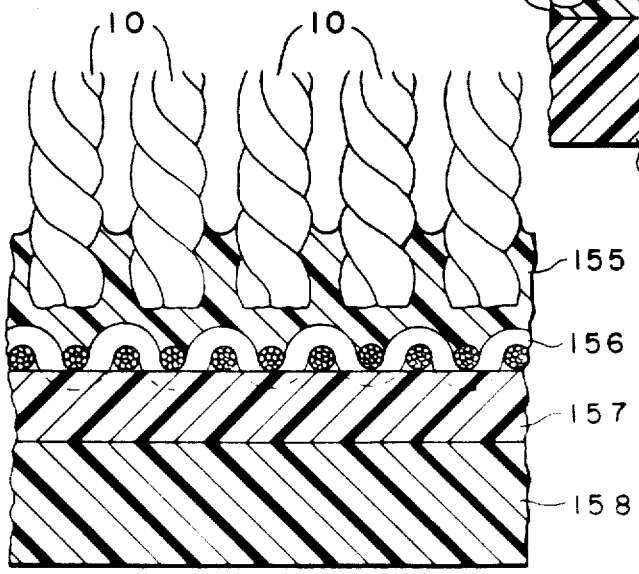

| KOH | Temp. | Pudo 193 | E6001 | P6001 | E2291 E40/20 | P2291 40/20 | P2291 40/30 | P2291 40/60 | Cell Constant |
|---|---|---|---|---|---|---|---|---|---|
| 40% | 20° C. | 11 mΩ-in$^2$ | 15 | 22 | 10 | 16 | 34 | 48 | 265 mΩ-in$^2$ |
| | 10° C. | 13 | 21 | 31 | 18 | 27 | 54 | 78 | 300 |
| | 0° C. | 17 | 30 | 46 | 30 | 35 | 83 | 116 | 333 |
| | −10° C. | 26 | 58 | 77 | 40 | 55 | 126 | 197 | 370 |
| | −20° C. | 41 | 88 | 127 | 53 | 114 | 254 | 387 | 445 |
| | −30° C. | 71 | 179 | 297 | 111 | 240 | 537 | 962 | 610 |
| 35% | 20° C. | 7 | 7 | 13 | 11 | 17 | 32 | 38 | 263 |
| | 10° C. | 8 | 8 | 18 | 13 | 24 | 43 | 56 | 277 |
| | 0° C. | 9 | 12 | 22 | 19 | 33 | 62 | 75 | 299 |
| | −10° C. | 17 | 21 | 36 | 29 | 54 | 100 | 121 | 337 |
| | −20° C. | 21 | 23 | 47 | 31 | 96 | 181 | 264 | 405 |
| | −30° C. | 42 | 39 | 94 | 65 | 173 | 338 | 471 | 525 |
| 30% | 20° C. | 5 | 8 | 15 | 8 | 13 | 27 | 33 | 256 |
| | 10° C. | 6 | 13 | 22 | 13 | 17 | 35 | 43 | 268 |
| | 0° C. | 8 | 17 | 28 | 17 | 25 | 52 | 66 | 287 |
| | −10° C. | 12 | 22 | 40 | 19 | 38 | 82 | 107 | 323 |
| | −20° C. | 18 | 30 | 55 | 32 | 58 | 140 | 174 | 375 |
| | −30° C. | 28 | 52 | 104 | 47 | 108 | 246 | 335 | 458 |
| 25% | 20° C. | 5 | 6 | 11 | 8 | 12 | 22 | 25 | 254 |
| | 10° C. | 6 | 7 | 13 | 9 | 16 | 31 | 34 | 268 |
| | 0° C. | 7 | 9 | 20 | 13 | 23 | 45 | 51 | 289 |
| | −10° C. | 9 | 13 | 26 | 18 | 38 | 65 | 72 | 312 |
| | −20° C. | 13 | 20 | 35 | 24 | 43 | 97 | 108 | 358 |
| | −30° C. | 14 | 28 | 58 | 41 | 87 | 185 | 219 | 432 |
| 20% | 20° C. | 4 | 6 | 11 | 7 | 11 | 21 | 24 | 255 |
| | 10° C. | 4 | 7 | 13 | 10 | 16 | 30 | 32 | 267 |
| | 0° C. | Broke | 10 | 19 | 14 | 23 | 42 | 47 | 287 |
| | −10° C. | Broke | 12 | 25 | 17 | 32 | 60 | 67 | 309 |
| | −20° C. | Broke | 17 | 35 | 25 | 48 | 91 | 102 | 345 |
| | −30° C. | Broke | 33 | 57 | 39 | 83 | 157 | 182 | 416 |

concentration which is usually quite low, i.e., approximately, 0.2%. Preferably concentrations of 1 to 2% of emulsifier in water are used, however, greater amounts may be used. The effect of emulsifier concentration in the emulsifier solution is shown in FIG. 2, note that an increase in concentration after approximately 1.3% has little or no effect on the resistance of the membrane. The emulsifier reduces the surfaces tension of the membrane and thereby increase the penetration of the electrolyte into the separator. In practice the separators of the present invention will contain from 0.005 to 3% of an emulsifier by weight, preferably 0.1±0.01%.

As would be understood by one skilled in the art, the effect of the emulsifier in decreasing the surface tension of a liquid in small pores is greater than the decrease noted in larger pores. In the small pores of a battery separator, in the order of 2 to 50 angstroms, the decrease in surface tension of the electrolyte probably is quite large. This increases the weight of electrolyte imbeded in the separator and can help in the "cleaning of the pores" within the separator. In addition the emulsifier also acts as an interfacial tension modifier between the KOH electrolyte and the separator and promotes wetting on the separator surfaces. Fast wetting-out may be an important consideration in electrolyte starved cells. The more efficient hydration of certain emulsifiers at low temperature rather than at high temperature may also be responsible for the good low temperature electrolytic resistance of the separator due to the fact that the emulsifiers impart to the separator a strong affinity for the electrolyte at low temperatures. For example, the hydration of polyglycol ether groups in emulsifiers is much more efficient at low temperatures than it is in higher temperatures. This is true because when heated, a sparingly soluble product in water is formed and separated from the aqueous solution with the liberation of the water of hydration.

As shown in Example 4 the sequence in which the separator is introduced to the water bath, potassium hydroxide bath and emulsifying solution also effects the amount the electrolytic resistance of the separator is reduced. It has been found that the electrolytic resistance is reduced the greatest amount when the separator is passed through the emulsifier after is passes through the potassium hydroxide bath.

Furthermore, as shown in Example 5 it is possible to increase the efficiency of the individual emulsifier by mixtures thereof. For instance a 100% solution of Ultrawet KX lowers the resistance of the separator to 13 mΩ-in$^2$ and a 100% solution of Triton X100 lowers the resistance of the same separator to 14 mΩ-in$^2$. However, a solution which consists of 25% Ultrawet KX and 75% of Triton X 100 lowers the resistance to 7 mΩ-in$^2$. This is due to the different solubility properties of the individual emulsifiers. Depending on the length of the polyglycol ether chain, emulsifiers of varying water solubility may be made. For example when the chain of polygylcol ether is six or more the emulsifier is usually soluble in relatively low temperature water, however, emulsifiers of this type will turn turbid and separate from solution upon heating. If on the other hand the emulsifier has less than six molecules of ethylene oxide it will not turn turbid and separate from solution at high temperatures.

Subsequent to the treatment by the emulsifier the membrane is dried and may be laminated with at least one sheet of cellophane. This cellophane lamination serves a twofold purpose. First it gives the completed membrance additional strength and second it prevents the migration of soluble silver oxides between the two compartments of the battery which may cause shorting and self-discharge of the cell. It has been found that the present membrance alone will not prevent the migration of all non-soluble silver, it will however, prevent the migration of all soluble silver, therefore, a combination of the present membrane and cellophane will stop almost all silver migration. As would be understood by one skilled in the art cellophane alone does not function as a commercially feasible battery separator since it is prone to rapid deterioration by the silver. Since, however, the membrane itself eliminates most of the silver the effects of the soluble silver which reaches the cellophane is negligible. In additon the combination of the membrane and cellophane gives a synergistic effect relative to silver penetration.

TABLE IV

SYNERGISTIC EFFECT OF GRAFTED MEMBRANES AND CELLOPHANE COMBINATION. LONG TERM SILVER PENETRATION AT 43° C. IN ION NaOH FOR A SIX LAYER STACK

This table indicates the number of hours of weeks it takes for silver to penetrate the indicated number of separator layers.

| Separator | 16 HRS. | 24 HRS. | 1 WEEK | 2 WEEKS | 3 WEEKS | 4 WEEKS |
|---|---|---|---|---|---|---|
| Cellophane | 1 layer | 1 layer | 1 layer | 2 layers | 6 layers* | 6 layers* |
| E-2291 40/20 | 5 layers | 6 layers | | | | |
| P-2291 40/20 | 5 layers | 5 layers | | | | |
| P-2291 40/30 | 4 layers | 4 layers | | | | |
| P-2291 40/60 | 4 layers | 4 layers | | | | |
| P2190 40/20 | | 1 layer | 1 layer | 1 layer | 1 layer | 1 layer |
| P2190 40/30 | | 1 layer | 1 layer | 1 layer | 1 layer | 1 layer |
| P3190 40/20 | | 1 layer | 1 layer | | | |

*Disintegrated

Referring to TABLE IV it can been seen that although all six layers of cellophane are penetrated by silver in three weeks and all six layers of grafted separators are penetrated in one to two days, the separator having a celephane component has only one layer of penetration of silver, thereby illustrating the unexpected synergistic effect of the present membrane and cellophane combination to silver penetration.

This invention will now be described with reference to further specific embodiments as illustrated in the examples which follow:

EXAMPLE 1

A separator was prepared using a cross-linked low density polyethylene base which was grafted with a 45% graft of methacrylic acid using a grafting solution of 32% methacrylic acid, 3.6% carbon tetrachloride and 64.4% toluene. The canister in the attached figure was used in this procedure, the tube having at its lower end a tetrafluoroethylene-hexafluoropropylene membrane. The film was then exposed to approximately 1.1 Mrads of gamma radiation. The separator was then boiled in water for three minutes at temperatures of 90° to 95° C. The separator was then boiled in 4% KOH for another three minutes at 90° to 95° C. and put into a 1.5% Ultrawet KX emulsifier solution for 30, 90 and 180 seconds. The electrolytic resistance was then measured in 40% KOH. Results are given in TABLE V.

TABLE V

EFFECT OF AN ANIONIC EMULSIFIER ON A BATTERY SEPARATOR

| Residence Time | Resistance in 40% KOH at RT |
|---|---|
| 0 (Control) | 32 mΩ-in$^2$ |
| 30 seconds | 18 |
| 90 seconds | 21 |
| 180 seconds | 20 |

EXAMPLE 2

A separator was prepared was in the first part of EXAMPLE 1 and then boiled in water for three minutes at 90° C. to 95° C., another three minutes in 4% KOH at 90° to 95° C. It was then put into a 2% solution of Triton X 400 for a time interval of 0 to 180 seconds. Results of electrolytic resistance are given in TABLE VI.

TABLE VI

EFFECT OF A CATIONIC EMULSIFIER ON A BATTERY SEPARATOR

| Residence Time | Residence in 40% KOH at RT |
|---|---|
| 0 (Control) | 75 mΩ-in$^2$ |
| 30 seconds | 58 |
| 90 seconds | 41 |
| 180 seconds | 27 |

EXAMPLE 3

A separator was prepared as described in the first part of Example 1. It was then boiled in water for three minutes at 90° C.-95° C. and three minutes in 40% KOH. It was then put into a 2% Triton X 100 emulsifier solution for three minutes. The electrolytic resistance of the separators are given in TABLE VII.

TABLE VII

EFFECT ON A NONIONIC EMULSIFIER ON A BATTERY SEPARATOR

| Residence Time | Residence in 40% KOH at RT |
|---|---|
| 0 (Control) | 74 mΩ-in$^2$ |
| 30 seconds | 21 |
| 90 seconds | 19 |
| 180 seconds | 20 |

EXAMPLE 4

A number of separators were prepared as described in the first part of Example 1 and each was subjected to the following sequence of baths: Separator A was boiled in water containing 0.2% Triton X100 for three minutes and then boiled in 4% KOH for another three minutes. Separator B was boiled in water for three minutes and then put into a 4% KOH bath containing 0.2% Triton X100. Separator C was boiled in water for three minutes then boiled for three in 4% KOH and then put into a 0.2% Triton X100 for three minutes. Separator D being a control experiment was boiled in water for three minutes then 4% KOH for three minutes. The resulting electrolytic resistance are given in TABLE VIII.

TABLE VIII

EFFECT OF EMULSIFICATION SEQUENCE ON SEPARATOR RESISTANCE

| Separator | Resistance in 40% KOH at RT |
|---|---|
| (A) | 30 mΩ-in$^2$ |
| (B) | 47 |
| (C) | 23 |
| (D) | 55 |

EXAMPLE 5

A number of separators were prepared as described in the first part of Example 1 and were boiled in water for three minutes and then in 4% KOH for another three minutes. They were then introduced into various emulsifying solutions comprising mixtures of nonionic and anionic emulsifiers having emulsifier mix concentrations of 2% in water for three minutes. Resulting electrolytic resistance are shown in TABLE IX.

TABLE IX

EFFECT OF EMULSIFIER MIX ON SEPARATORS

| Emulsifier Mix | Resistance in 40% KOH at RT |
|---|---|
| 100% Ultrawet KX | 13 mΩ-in$^2$ |
| 75% Ultrawet KX<br>25% Triton X100 | 10 |
| 50% Ultrawet KX<br>50% Triton X100 | 8 |
| 25% Ultrawet KX<br>75% Triton X100 | 7 |
| 100% Triton X100 | 14 |
| Control | 30 |

This invention has been described in terms of specific embodiments set forth in detail. Alternate embodiments will be apparent to those skilled in the art in view of this disclosure, and accordingly such modifications are to be contemplated within the spirit of the invention as disclosed and claimed herein.

What is claimed is:

1. An improved process for the preparation of a membrane suitable for use in electrochemical cells comprising:

(a) forming a grafting solution comprising a hydrophilic monomer, and [an organic] *a* solvent *selected from the group consisting of an organic solvent which incorporates a transfer agent, and a chlorinated hydrocarbon;*

(b) placing said solution in contact with an inert polymeric film;

(c) irradiating said contacted film to graft polymerize said hydrophilic monomer onto the film, while inhibiting homopolymerization of said graft monomer; and (d) contacting said irradiation grafted film with an emulsifier to reduce the electrolytic resistance of said membrane.

2. The process of claim 1 wherein the grafted polymeric film is laminated with at least one layer of cellophane.

3. The process of claim 1 wherein said grafting solution comprises from about 1 to 50% of said monomer, and from about 50 to 99% *of a* chlorinated organic solvent by weight and said inert polymeric film is non-cross linked.

4. The process of claim 3 wherein said monomer is selected from the group of acrylic and methacrylic acid, said chlorinated organic solvent is methylene chloride.

5. The process of claim 4 wherein the hydrophilic monomer comprises about 20% and said organic solvent comprises about 80% of said grafting solution.

6. The process of claim 1 wherein said grafting solution comprises from about 10 to 50% of the monomer, from about 3 to 6% of a transfer agent and from about 44 to 87% of a solvent for said monomer each by weight of the entire grafting solution.

7. The process of claim 6 wherein said monomer is selected from the group of acrylic and methacrylic acid, said transfer agent is carbon tetrachloride and said solvent is toluene.

8. The process of claim 7 wherein said monomer is about 32%, said transfer agent is about 3.6% and said solvent is about 64.4% each by weight of the entire grafting solution.

9. The process of claim 1 wherein said emulsifier is a surface active agent selected from the group of anionics, cationics and non-ionics.

10. The process of claim 1 wherein a chemical inhibitor selected from the group of hydroquinone and hydroquinone methyl ether is added to the grafting solution to inhibit homopolymerization of the hydrophilic monomer.

11. The method of claim 10 wherein the chemical inhibitor is contained in a micro-porous polypropylene sack.

12. The process of claim 1 wherein air is introduced into the grafting solution to inhibit homopolymerization of the hydrophilic monomer.

13. The process of claim 11 wherein air is introduced to the lower portions of the grafting solution by means of a tube which extends from the lower portions of the grafting solution to a point outside said solution in contact with the atmosphere adapted at its lower end with a gas-permeable membrane which permits air to diffuse into the solution while prohibiting the solution from entering the tube.

14. The process of claim 9 wherein the anionic surface active agent is selected from the group consisting of carboxylic acid salts, sulfuric acid esters, alkane sulfonates alkylarylsulfonates and mixtures thereof.

15. The process of claim 9 wherein the cationic surface active agent is selected from the group consisting of quaternary nitrogen salts, non quaternary nitrogen bases and mixtures thereof.

16. The process of claim 9 wherein the nonionic surface active agent is selected from the group consisting of ethylene oxide derivatives, polyhydroxy esters of sugar alcohols, amphoteric surfactants and mixtures thereof.

17. The process of claim 1 wherein the emulsifier is a surface active agent selected from the group consisting of isooctyl phenoxyl polyethoxy ethanol, alkoxypolyethylene oxyethanol, sodium linear alkyl sulfonate, laury ethoxylate sulfate, stearyl-dimethylbenzylammonium chloride and mixtures thereof.

18. The process of claim 9 wherein the emulsifier solution has about the same hydrophilic-lipophilic balance as the grafted electrochemical cell separator to be emulsified.

19. The process of claim 1 wherein said emulsifier is employed as an aqueous solution.

20. The process of claim 19 wherein said emulsifier comprises about 1–2% of said aqueous solution by weight.

21. The process of claim 19 wherein the residence time of said separator in the aqueous emulsifier solution is from a few seconds to about five minutes.

22. The process of claim 20 wherein the residence time of said separator in the aqueous emulsifier solution is about two minutes.

23. The process of claim 19 wherein the temperature of said aqeuous emulsifier solution is from about 80° C. to 90° C.

24. The process of claim 19 wherein said aqueous emulsifier solution comprises a mixture of an anionic and a non-ionic emulsifier.

25. The process of claim 24 wherein said mixture of an anionic and non-ionic emulsifier consists of from about 25% to 50% anionic emulsifier and from about 50% to 75% non-ionic emulsifier.

*26. The process of claim 1 wherein said organic solvent is selected from the group consisting of toluene and chlorinated organic hydrocarbons.*

*27. The process of claim 26 wherein said emulsifier is a surface active agent selected from the group of anionics, cationics and non-ionics.*

*28. The process of claim 27 wherein the anionic surface active agent is selected from the group consisting of carboxylic acid salts, sulfuric acid esters, alkane sulfonates, alkylaryl sulfonates and mixtures thereof.*

*29. The process of claim 27 wherein the cationic surface active agent is selected from the group consisting of quaternary nitrogen salts, non-quaternary nitrogen bases and mixtures thereof.*

*30. The process of claim 27 wherein the nonionic surface active agent is selected from the group consisting of ethylene oxide derivatives, polyhydroxy esters of sugar alcohols, amphoteric surfactants and mixtures thereof.*

* * * * *

UNITED STATES PATENT AND TRADEMARK OFFICE

CERTIFICATE OF CORRECTION

PATENT NO. : RE 31,824

DATED : February 5, 1985

INVENTOR(S) : V.F. D'Agostino, J.V. Lee, J.C. Santisi

It is certified that error appears in the above-identified patent and that said Letters Patent is hereby corrected as shown below:

Claim 1

1. An improved process for the preparation of a membrane suitable for use in electrochemical cells comprising:

(a) forming a grafting solution comprising a hydrophilic monomer, and a [chlorinated organic] solvent <u>selected from the group consisting of an inorganic solvent which incorporates a transfer agent, and a chlorinated hydrocarbon</u>;

(b) placing said solution in contact with an inert polymer film;

UNITED STATES PATENT AND TRADEMARK OFFICE

CERTIFICATE OF CORRECTION

PATENT NO. : RE 31,824

DATED : February 5, 1985

INVENTOR(S) : V.F. D'Agostino, J.V. Lee, J.C. Santisi

It is certified that error appears in the above-identified patent and that said Letters Patent is hereby corrected as shown below:

(c) irradiating said contacted film to graft polymerize said hydrophilic monomer onto the film, while inhibiting homopolymerization of said graft monomer; and (d) contacting said irradiation grafted film with an emulsifier to reduce the electrolytic resistance of said membrane.

Signed and Sealed this

*First* Day of *July 1986*

[SEAL]

*Attest:*

*Attesting Officer*

DONALD J. QUIGG

*Commissioner of Patents and Trademarks*